(12) United States Patent
Ellison et al.

(10) Patent No.: US 6,556,757 B2
(45) Date of Patent: Apr. 29, 2003

(54) OPTICAL FIBER WITH ABSORBING OVERCLAD GLASS LAYER

(75) Inventors: Adam J.G. Ellison, Corning, NY (US); John D. Minelly, Painted Post, NY (US); Jackson P. Trentelman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 10 days.

(21) Appl. No.: 09/793,851

(22) Filed: Feb. 26, 2001

(65) Prior Publication Data

US 2001/0055456 A1 Dec. 27, 2001

Related U.S. Application Data

(60) Provisional application No. 60/188,492, filed on Mar. 10, 2000.

(51) Int. Cl.$^7$ .............................. G02B 6/02; G02B 6/22
(52) U.S. Cl. .................. 385/127; 385/123; 385/141; 385/142; 385/144; 359/341.1
(58) Field of Search .................. 385/123–128, 385/141–146; 359/333–349

(56) References Cited

U.S. PATENT DOCUMENTS

| | | |
|---|---|---|
| 3,253,500 A | 5/1966 | Hicks |
| 3,607,322 A | 9/1971 | Brady et al. |
| 4,083,506 A | 4/1978 | Mander et al. |
| 4,217,123 A | 8/1980 | Titchmarsh |
| 4,372,648 A * | 2/1983 | Black .......................... 385/127 |
| 4,383,653 A | 5/1983 | Nakazawa et al. |
| 4,519,198 A | 5/1985 | Kissel |
| 4,659,215 A | 4/1987 | Sumida et al. .............. 356/73.1 |
| 4,693,545 A * | 9/1987 | Henningsen et al. ........ 359/900 |
| 4,729,777 A | 3/1988 | Mimura et al. |
| 4,752,112 A | 6/1988 | Mayr |
| 5,046,815 A | 9/1991 | Cain et al. |
| 5,121,460 A | 6/1992 | Tumminelli et al. ........ 385/126 |
| 5,277,373 A | 1/1994 | Morton |
| 5,467,218 A | 11/1995 | Takeda et al. ............... 359/341 |
| 5,486,378 A | 1/1996 | Oestreich et al. |
| 5,522,007 A | 5/1996 | Drouart et al. |
| 5,778,129 A | 7/1998 | Shukunami et al. ......... 385/127 |
| 5,861,973 A | 1/1999 | Inagaki et al. .............. 359/341 |
| 5,892,876 A | 4/1999 | Desurvire et al. ........... 385/123 |
| 5,970,197 A | 10/1999 | Pavlath ........................ 385/123 |
| 5,970,198 A * | 10/1999 | Inagaki et al. .............. 385/127 |
| 6,118,575 A * | 9/2000 | Grubb et al. ................ 359/337 |

FOREIGN PATENT DOCUMENTS

| | | |
|---|---|---|
| EP | WO 94/26645 | 5/1994 |
| WO | WO 95/20538 | 8/1995 |
| WO | WO 99/51537 | 10/1999 |

OTHER PUBLICATIONS

Nagel et al, "An overview of the Modified Chemical Vapor Deposition (MCVD) Process and Performance" ©1982, 459–476.

Wiley, John; "Optical Fibers for Transmission"; ©1979; 166–178.

Blakenship et al; "The Outside Vapor Deposition Method of Fabricating Optical Waveguide Fibers" ©1982; 1418–1423.

Inada, "Recent Progress in Fiber Fabrication Techniques by Vapor–Phase Axial Deposition", ©1982, 1424–1431.

* cited by examiner

*Primary Examiner*—Hemang Sanghavi
*Assistant Examiner*—Scott A Knauss
(74) *Attorney, Agent, or Firm*—Gregory V. Bean

(57) ABSTRACT

The disclosed invention includes an amplifier fiber and methods of making the amplifier fiber. One embodiment of the inventive fiber includes a glass core and a glass cladding layer surrounding the glass core. The cladding glass layer has a refractive index which is less than a refractive index of the glass core. The fiber also includes a glass overclad layer surrounding the cladding layer. The overclad layer has a refractive index which is greater than the refractive index of the cladding layer. In another embodiment of the inventive fiber, the overclad layer is doped with an absorber. The absorber strips a mode of light propagating in the cladding from the cladding layer.

22 Claims, 5 Drawing Sheets

OPTICAL FIBER WITH ABSORBING OVERCLAD GLASS LAYER

This application claims the benefit of Provisional application Ser. No. 60/188,492, filed Mar. 10, 2000.

FIELD OF THE INVENTION

The present invention relates generally to optical fibers, more specifically to amplifier fibers which contain an absorbing outer glass layer to minimize transmission of cladding modes.

BACKGROUND OF THE INVENTION

Figure 1:
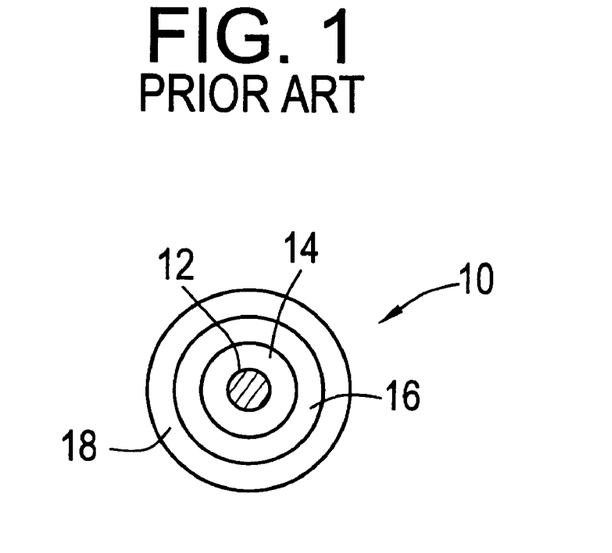
FIG. 1 is a cross-sectional view of a prior art fiber.

A typical geometry for an amplifier fiber 10 is illustrated in FIG. 1, where the fiber contains a circular core 12 at the center of the fiber, a cylindrical clad 14 surrounding the core, a primary or inner polymeric coating 16 which surrounds the clad, and a secondary or outer polymeric coating 18 which surrounds the primary coating. Typically, the refractive indices of the various materials used to prepare the optical fiber will be as follows: a relatively high refractive index for the core 12, a refractive index for the clad 14 which is lower than that of the core, and a refractive index for the primary coating 16 which approximates or is greater than that of the clad. Generally, the refractive index of the secondary coating 18 can be independent of the indices of the other materials.

The purpose of the higher core index is to cause light injected into the fiber to propagate along the core rather than through the clad. The refractive index of the primary coating approximates the refractive index of the clad at the wavelength of interest. If the refractive index of the primary coating is less than that of the clad, then the clad itself can act as a waveguide, much like a huge core within a plastic clad. When light escapes from the core and propagates down the clad (rather than the core), it is referred to as a cladding mode. The phenomenon results in detrimental interference and distortion of the signal in the core. Thus, a need exists for a glass fiber construction which is capable of reducing the propagation of cladding modes.

In telecommunication applications, the primary coating is typically highly absorbing in the infrared. This is largely due to the predominance of C—H bonds, which have high vibrational frequencies and the overtones of which produce near opacity over very short path lengths. As a result, an index-matched polymer layer outside the clad will extinguish cladding modes as they propagate along the length of the fiber. There are cases, however, in which it is difficult to design a deployable polymer coating to index match a glass. For example, when clad indices exceed 1.6, then it becomes necessary to incorporate halogenated or aromatic hydrocarbons, which can pose health risks and may be water sensitive. At still higher indices, >1.8, it may be very difficult to prepare any plastic polymer with an appropriate refractive index, much less one that can survive service conditions. Likewise, a need exists for an optical amplifier fiber which utilizes a glass fiber construction that can achieve a reduction in cladding mode propagation while using conventional primary and secondary coatings.

The present invention is directed to overcoming these deficiencies in the art.

SUMMARY OF THE INVENTION

One aspect of the present invention relates to an amplifier fiber. The fiber includes a glass core and a glass cladding layer surrounding said glass core. The glass cladding layer has a refractive index which is less than a refractive index of the glass core. The fiber also includes a glass overclad layer surrounding the cladding layer. The overclad layer has a refractive index which is greater than the refractive index of the cladding layer. Alternatively, the overclad layer can be doped with an absorber for stripping a mode of light propagating in the cladding layer of the fiber from the cladding layer.

A further aspect of the invention relates to a method of making the amplifier fiber described above. A preform having a core glass material surrounded by a clad glass material and an overclad glass material is heated. The overclad layer has a refractive index greater than that of the clad or alternatively, the overclad is doped with an absorbing material. The heated preform is drawn under conditions effective to prepare the fiber.

An additional aspect of the invention includes a method of making the amplifier fiber by simultaneously drawing the glass core from a body of molten core glass material, drawing the cladding layer from a body of cladding layer material, and drawing the overclad layer from a body of overclad layer material under conditions effective to form the fiber.

Other aspects of the present invention relate to the amplifier fiber that include the fiber of the present invention and one or more polymeric coating layers which encapsulate the glass fiber; and an optical amplifier or laser that includes the fiber of the present invention, wherein the glass core contains a glass having an effective amount of a dopant which yields a sufficient signal gain over a predetermined length of the optical fiber.

The fiber of the present invention, as well as the amplifiers or lasers formed therefrom, is capable of stripping modes of light that may be propagating along the cladding layer of the fiber. An additional advantage of the invention is that the length of amplifier fiber required to strip the cladding mode can be relatively short. The fiber of the invention also has the advantage that the amount of absorption of the overclad layer may be manipulated to preselected amounts for desired applications of the fiber.

The fiber of the invention also has the advantage of being a low attenuation fiber. Furthermore, the invention has the advantage that it is applicable to glass compositions that were previously unsuitable for use in fiber optics applications.

Additional features and advantages of the invention will be set forth in the detailed description which follows, and in part will be readily apparent to those skilled in the art from the description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 2:
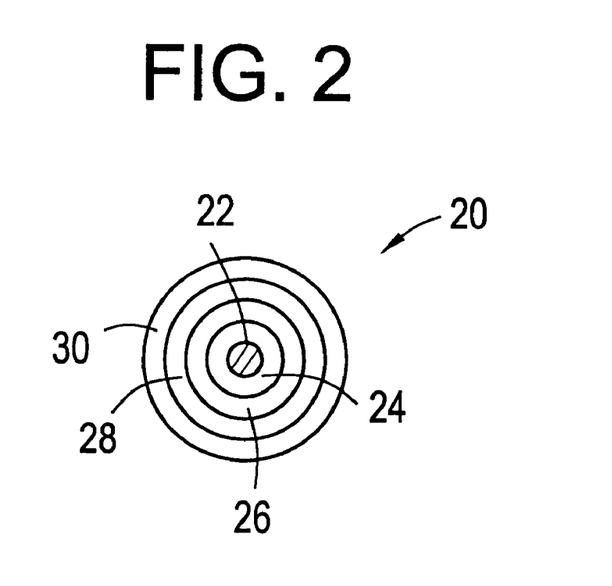
FIG. 2 is a cross-sectional view of an amplifier fiber of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the inventive fiber is shown in FIG. 2, and is designated generally throughout by reference numeral 20.

The inventive fiber 20 is preferably an amplifier fiber, meaning it is capable of boosting optical signal strength in a derived operating wavelength range of 1290 to 1650 nm, preferably 1420 to 1640 nm, more preferably 1520 to 1640 nm. Fiber 20 has a glass core 22 and a glass cladding layer 24 surrounding core 22. Typically, core 22 is doped with an amplification dopant. The rare earths (elements 57–71 of the periodic table) are one example of amplification dopants. A preferred rare earth dopant is erbium. However, the invention is not limited to the aforementioned amplification dopants. Core 22 propagates modes of interest of light along the length of fiber 20. The modes interest in the telecommunications industry include wavelengths in the range of 1200 nm to 1700 nm, especially wavelengths in the 1550 nm operating window. The modes of interest include the fundamental mode.

The refractive index of cladding layer 24 is generally less than the refractive index of glass core 22. Fiber 20 also includes a glass overclad layer 26 surrounding cladding layer 24. The refractive index of overclad layer 26 is greater than the refractive index of cladding layer 24. It is preferred that the refractive index of overclad layer 26 is at least about 0.001 greater than the refractive index of cladding layer 24 and preferably no more than about 0.1 greater than the refractive index of cladding layer 24.

Figure 3:
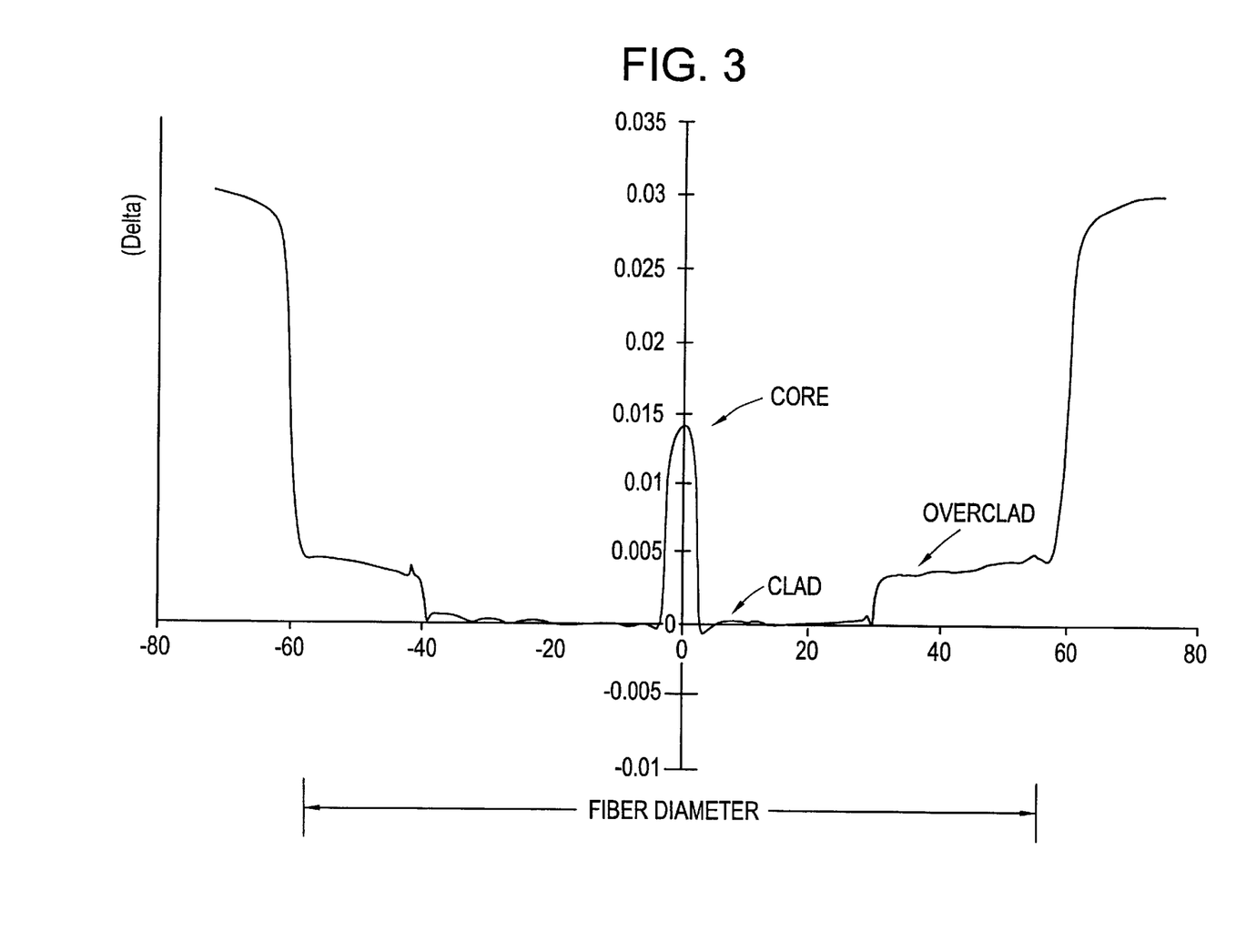
FIG. 3 is a graph depicting delta (Δ) values of the various layers of an optical fiber of the present invention, with the refractive index of the clad layer being the baseline which is set to zero.

For one embodiment, the differences in refractive index among core 22, cladding 24, and overclad 26 of fiber 20 is illustrated in FIG. 3. The differences in refractive index between core 22 and cladding 24 and overclad 26 are expressed in terms of delta (Δ).

$$\Delta_o = (n_o^2 - n_c^2)/2(n_o^2)$$

The $\Delta_o$ is the Δ of any particular region with respect to the index of refraction of the cladding. The $n_o$ is the index of refraction of a particular region of the fiber and $n_c$ is the index of refraction of the cladding. As shown in FIG. 3, core 22 has refractive index having a delta of about 0.015. The delta of overclad 26 is up to about 0.03 or more relative to cladding 24.

Referring again to FIG. 2, encapsulating overclad 26 of the glass fiber is a primary coating material 28 and a secondary coating 30. Although it may be desirable in some instances to only provide a primary coating material 28, most conventional optical fibers contain at least two coatings. The primary coating is applied directly to the glass fiber and, when cured, forms a soft, elastic, and compliant material which encapsulates the glass fiber. The primary coating serves as a buffer to cushion and protect the glass fiber when the optical fiber is bent, cabled, or spooled. Any suitable primary coating material can be employed in the optical fiber of the present invention. The secondary coating is applied over the primary coating and functions as a tough, protective outer layer that prevents damage to the glass fiber during processing and use. Any suitable secondary coating material can be employed in the optical fiber of the present invention. A number of primary and secondary coating compositions are commercially available from a number of vendors, such as DSM Desotech (Elgin, Ill.).

In a preferred embodiment of fiber 20, overclad layer 26 is doped with at least one absorber. An absorber is a material in overclad 26 that inhibits the propagation of light in cladding 24. The material will absorb light propagating in cladding 24 and not emit light into cladding 24. One aspect of an absorber may include converting at least a portion of the light absorbed from cladding 24 into heat or vibrational energy. Another aspect of an absorber is that the absorber may attenuate the light stripped from cladding 24. The light propagating in cladding 24 may be referred to as a cladding mode.

Transition metal ions, rare earth ions, metals, metalloids, organic dyes, and combinations thereof are examples of absorbers. Preferred transition metal absorbers include vanadium ions (e.g., $V^{3+}$), erbium ions (e.g., $Er^{3+}$), titanium ions (e.g., $Ti^{3+}$), iron ions (e.g., $Fe^{2+}$), copper ions (e.g., $Cu^{2+}$), praseodymium ions (e.g., $Pr^{3+}$), and ytterbium ions (e.g., $Yb^{3+}$) and mixtures thereof. Preferred metal or metalloid absorbers include platinum, carbon, and mixtures thereof A more preferred group of absorbers may include erbium ions, iron ions, copper ions, praseodymium ions, and nickel ions and mixtures thereof. The invention is not limited to the aforementioned absorbers. In one embodiment of fiber 20, each one of the more preferred group of absorbers is present in a concentration of at least about 50 ppm, preferably at least about 1000 ppm, more preferably at least about 1500 ppm, and most preferably at least about 2000 ppm in overclad layer 26.

In one embodiment, the clad is surrounded by an overclad layer of glass with a slightly higher $n_D$ refractive index of 1.637. This layer is doped with approximately 2000 ppm each of $Ni^{2+}$, $Cu^{2+}$, $Fe^{3+}$, $Pr^{3+}$, and $Er^{3+}$, which collectively produce nearly uniform, very intense absorption between 0.8 and 1.7 $\mu$m.

Core 22, cladding 24, and overclad layer 26 may be made of any glass suitable for manufacturing an optical waveguide fiber. A preferred material of construction for at least one of core 22, cladding 24, and overclad layer 26 is antimony-oxide glass. More preferably each of core 22, cladding 24, and overclad layer 26 is made of antimony-oxide glass. A preferred antimony-oxide glass is described in PCT Publication No. WO 99/51537 to Dickinson et al. and U.S. patent application Ser. No. 09/499010 to Dickinson et al., filed Feb. 4, 2000, which are both hereby incorporated by reference.

Where both glass core 22 and cladding layer 24 are formed from the same glass system, an appropriate refractive index differential can be obtained by introducing slight variations of the glass system components and introducing other refractive index modifying components. For example, it is possible to adjust the refractive index of antimony-oxide glass by modifying the ratio of $Sb_2O_3$ and $SiO_2$.

Likewise, when overclad layer 26 and cladding layer 24 are formed of an antimony-oxide glass, the refractive index differential between layers 24 and 26 can also be achieved by introducing slight variations of the glass system components and introducing other refractive index modifying components Overclad layer 26 should be capable of substantially eliminating the cladding modes over a length of fiber of about 100 meters, preferably no more than about 30 meters, more preferably no more than about ½ a meter, and most preferably in no more than about 5 centimeters. The length of fiber 20 necessary to strip the cladding modes may be controlled by increasing or decreasing the amount of absorbers in overclad layer 26. The greater the concentration of absorbers in overclad layer 26, the quicker the cladding modes will be stripped from cladding layer 24 and shorter lengths of fiber 20 may be used to practice the invention.

In a preferred embodiment, overclad layer 26 has an absorption coefficient that is at least about ten times greater than an absorption coefficient of the glass core 22. The absorption coefficient for overclad 26 is calculated by multiplying the absorption coefficient for the overclad material by the ratio of the area of the overclad to the area of the fiber. It is further preferred that overclad layer 26 has an inner radius that is at least three times greater than the outer radius of core 22, more preferably five (5) to eight (8) times greater, both of these radii are measured from the centerline of the optical fiber.

The thickness of overclad layer 26 will depend upon the specific application. In general, it is desirable to avoid attenuating the modes propagating along the core, in which case it is desirable to locate the overclad layer several core diameters away from the core. For example, a 10 $\mu$m thick overclad layer located on the outer most portion of a 125 $\mu$m diameter fiber with a 5 $\mu$m core diameter will be separated by a cladding layer of about 50 $\mu$m thick.

Preferably, fiber 20 is a low attenuation fiber. It is preferred that fiber 20 demonstrates an attenuation of less than 0.3 dB/m, more preferably less than about 0.2 dB/m. It is most preferred that fiber 20 demonstrates an attenuation of no more than 0.15 dB/m.

In another embodiment of fiber 20, the refractive index of overclad layer 26 is about the same as the refractive index of cladding layer 24. The refractive index of overclad layer 26 is within at least about ±0.1 of the refractive index of cladding 24, preferably the refractive index of overclad 26 is within about +0.02 of the refractive index of cladding 24, more preferably the refractive index of overclad 26 is within about ±0.001 of the refractive index of cladding 24, and most preferably the refractive index of overclad 26 is same as the refractive index of cladding layer 26. In this embodiment, overclad layer 26 is also doped with at least one of the aforementioned absorbers. It is also preferred that this embodiment of fiber 20 is constructed from the above mentioned antimony-oxide glass.

Suitable methods to make inventive fiber 20 include, without limitation, the triple crucible method, rod-in-tube procedures, and doped deposited silica processes, also commonly referred to as chemical vapor deposition ("CVD") or vapor phase oxidation. Of these, the triple crucible method is preferred, because it avoids the need to prepare preforms from which the glass fiber is drawn. The triple crucible method is a variation of the double crucible method as described, for example, in Midwinter, *Optical Fibers for Transmission*, New York, John Wiley, pp. 166–178 (1979); U.S. Pat. No. 4,729,777 to Mimura et al.; and U.S. Pat. No. 4,217,123 to Titchmarsh, which are hereby incorporated by reference.

Three crucibles containing, respectively, the core glass material, the cladding layer glass material, and the overclad glass material are provided such that apertures or orifices therein are approximately concentrically aligned above one another. For example, as the melt of the core glass material flows from the orifice of one crucible, it contacts and is surrounded by the melt of the clad glass material such that the combined melts flow from the orifice of the second crucible. Likewise, as the combined melts flow from the orifice of the second crucible, they contact and are surrounded by the melt of the overclad glass material, and the three melts collectively flow from the orifice of the third crucible. The three-layered glass fiber is then drawn from the combined melts flowing from the third orifice. Preferably, the fiber is drawn simultaneously from the three crucibles under conditions effective to form the fiber.

Fiber 20 may also be constructed from a variety of CVD processes. Suitable process include external CVD processes such as OVD (Blakenship et al., "The Outside Vapor Deposition Method of Fabricating Optical Waveguide Fibers," *IEEE J. Quantum Electron.*, 18:1418–1423 (1982), which is hereby incorporated by reference) or axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference). Any variation of these or other known methods can also be employed.

These processes have in common that a preform which contains material for core 22, cladding layer 24, and overclad layer 26 is formed. The preform is preferably cylindrical and symmetrical along the axis of the preform. Fiber 20 is drawn from the preform. In drawing fiber from the preform, the preform is locally and symmetrically heated to a temperature, e.g., of about 2000° C. As the preform is heated, such as by feeding the preform into and through a furnace, a glass fiber is drawn from the molten material. Preferably, the glass fiber is cooled rapidly to avoid significant crystal growth within the amorphous glass system.

A further aspect of the present invention relates to a fiber optic ribbon or bundle that includes a plurality of substantially aligned optical fibers of the present invention and a matrix encapsulating the plurality of optical fibers.

Figure 4:
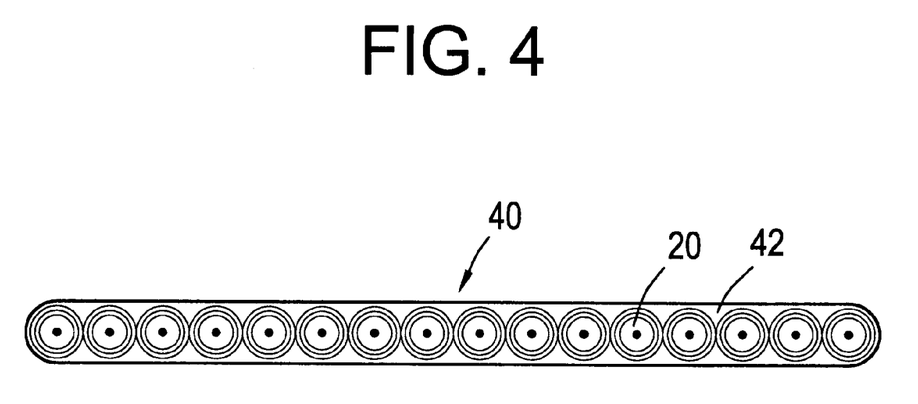
FIG. 4 is a cross-sectional view of the fiber of the invention in a ribbon format.

One embodiment of this aspect of the present invention is illustrated in FIG. 4. As shown, a fiber optic ribbon 40 of the present invention includes a plurality of optical fibers 20 substantially aligned relative to one another in a substantially planar relationship and encapsulated by matrix 42. By substantially planar, it is intended that optical fibers 20 are not displaced from a common plane by a distance of more than about one-half the diameter thereof. By substantially aligned, it is intended that the optical fibers 20 are generally parallel with other optical fibers along the length of the fiber optic ribbon 40. In FIG. 4, the fiber optic ribbon 40 contains sixteen (16) optical fibers 20; however, it should be apparent to those skilled in the art that any number of optical fibers 20 (e.g., two or more) may be employed to form fiber optic ribbon 40 disposed for a particular use.

The fiber optic ribbons of the present invention may be encapsulated by the matrix 42 in any known configuration (e.g., edge-bonded ribbon, thin-encapsulated ribbon, thick-encapsulated ribbon, or multi-layer ribbon) by conventional methods of making fiber optic ribbons.

The fiber optic ribbon may be prepared by various methods. For example, upon alignment of a plurality of substantially planar optical fibers, the composition of the present invention can be applied and cured according to known methods of preparing optical fiber ribbons as described in U.S. Pat. No. 4,752,112 to Mayr and U.S. Pat. No. 5,486,378 to Oestreich et al., which are hereby incorporated by reference. Alternatively, the secondary coating can be dissolved with a solvent and, while still wet, the plurality of optical fibers can be brought together before the wet coatings re-polymerize, thereby joining the plurality of fibers together in the substantially planar, substantially aligned relationship.

Although not shown, one of skill in the art will readily appreciate that fibers of the present invention can be utilized in fiber bundles, such as blown fiber subunits, which contain a plurality of substantially aligned optical fibers and a matrix encapsulating the plurality of optical fibers. Fiber bundles differ from ribbons by lacking a substantially planar arrangement of the plurality of optical fibers therein. An exemplary construction of such subunits is disclosed in U.S. Pat. No. 5,046,815 to Cain et al., which is hereby incorporated by reference. The fiber bundle can be prepared in much the same manner as the fiber optic ribbon.

One of skill in the art will readily appreciate that the overclad layer as used in optical fibers of the present invention is not limited to fiber having an annular overclad and a concentric cladding layer or a cladding layer having a concentric core. In another embodiment of the invention at least one of the cladding and the overclad is not cylindrical, e.g. the cladding may be rectangular.

Figure 5:
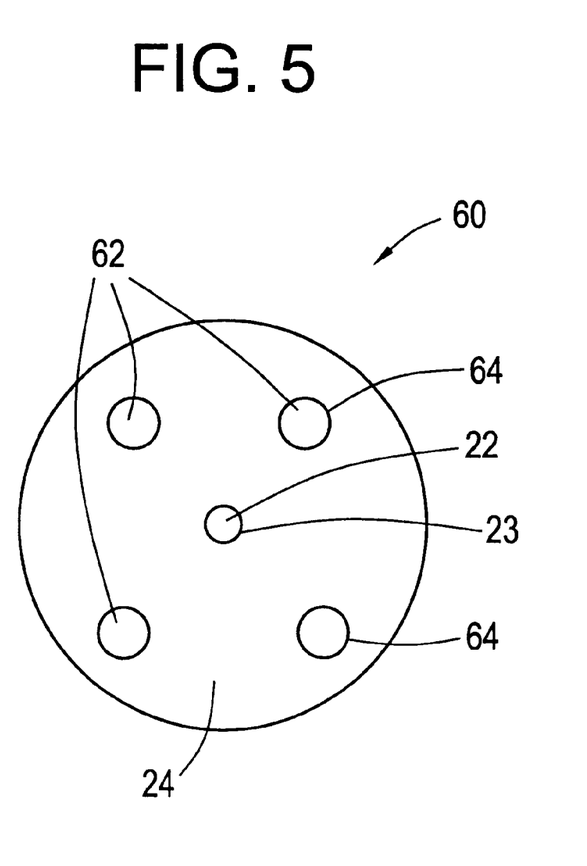
FIG. 5 is a cross-sectional view of an amplifier fiber of the present invention.

Another embodiment of the invention is shown in FIG. 5. In FIG. 5, core 20 of fiber 60 is surrounded by cladding layer 24. Cladding layer 24 includes at least one absorbing section 62, preferably cladding layer 24 includes a plurality of absorbing sections 62. It is preferred that an outer surface 64 of each absorbing section is disposed at least three (3) core diameters away from an outer surface 23 of core 22. More preferably, each outer surface 64 is at least five (5) to eight (8) core diameters away from outer surface 23 of core 22.

It is preferred that core 22 is located the center line of fiber 60. It is also preferred, but not required, that core 22 is concentric with cladding 24. It is further preferred that each absorbing section 62 is equidistant from core 22 and that each absorbing section 62 is symmetrically disposed within cladding 24.

Fiber 60 may be produced from an optical fiber preform. The preform includes a core and cladding which can be produced by any of the above described techniques. The preform may be a soot preform or a dense glass preform. The preform includes at least one chamber, preferably a plurality of chambers. A glass tube consisting of absorption material is inserted into the each chamber. The preform is consolidated into a blank which is drawn into fiber 60.

A glass suitable for amplifier applications is generally characterized by having an effective amount of a dopant which yields a sufficient signal gain over a predetermined length of the optical fiber. Typically, such dopants include, without limitations, effective amounts of rare earth metal ions, although any dopant which yields suitable results can be employed.

For optical amplifier applications, the wavelength region over which a convolution of the emission and absorption spectra is the flattest is the optimal window through which to pass signals. Because both the position of the overall emission bands and the structure within the bands vary according to the content of the host glass, the window with optimal gain flatness also varies. Ideally, one would like to obtain the broadest emission possible in a single glass while maintaining gain flatness below acceptable levels. A flat emission spectrum is generally considered as one having less than 10% gain deviation over bands (or windows) up to about 30 nm wide, preferably between at least about 35 nm wide.

Figure 6:
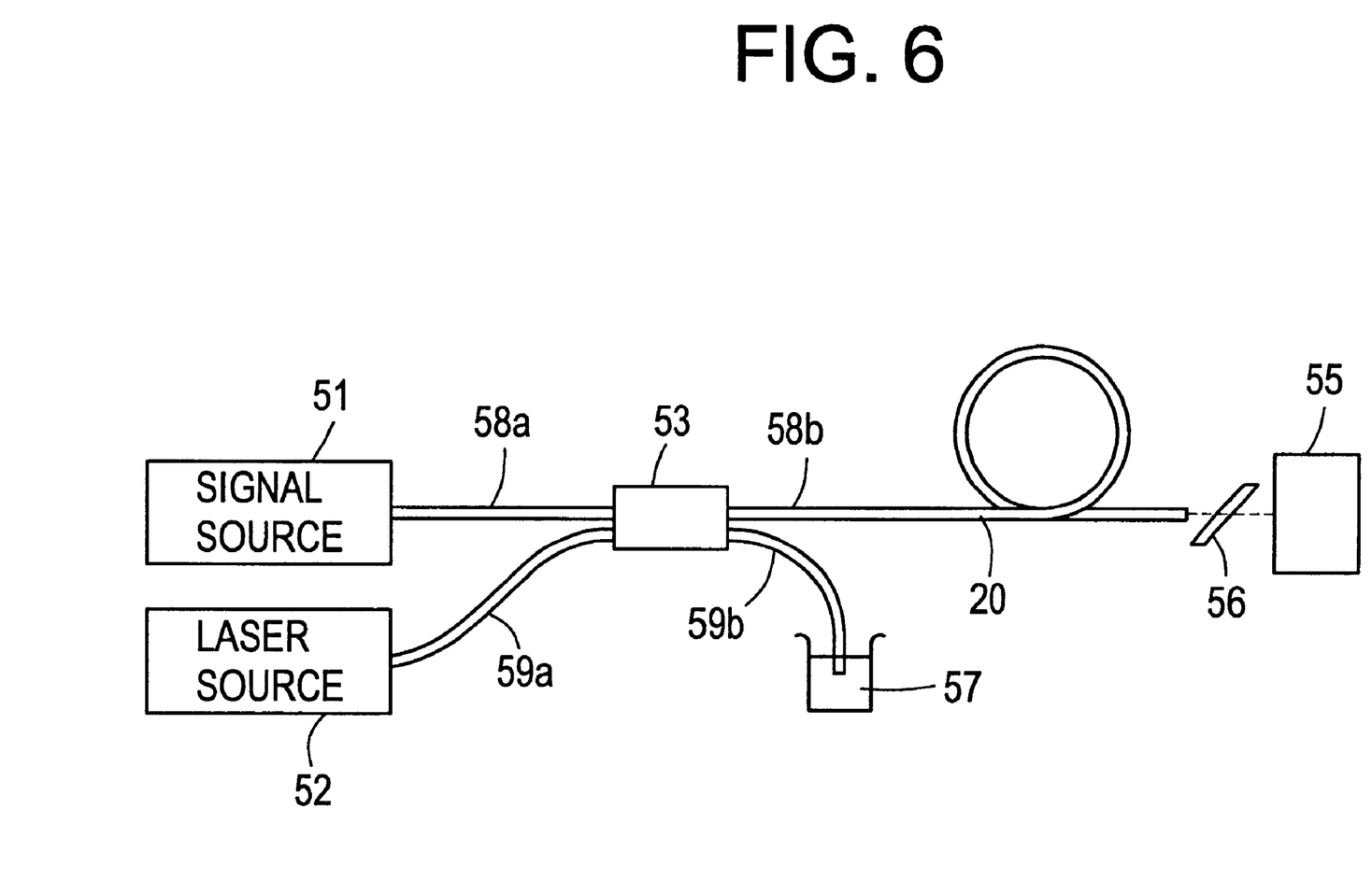
FIG. 6 is an optical amplifier incorporating the fiber of the present invention.

As shown in FIG. 6, an exemplary fiber amplifier of the present invention includes an optical fiber 20 of the present invention having a glass core which is doped with rare earth ions, an excitation laser source 52, and optical device (53, 58a, 58b, 59a, and 59b). The laser source 52 generates an excitation light at the 980 nm and/or the 1480 nm wavelength band. The optical device (53, 58a, 58b, 59a and 59b) directs the excitation light from the laser source 52 to the optical fiber 20. The excitation light from the laser source 52 is directed to the fiber coupler 53 through the optical fiber 59a and combined with a signal light which is directed to the fiber coupler 53 from a signal light source 51 through the optical fiber 58a. The combined signal light and excitation light are coupled to the optical fiber 20 through the optical fiber 58b. Signal light source 51 may be operating in either the 1300 or 1550 operating windows.

The fiber coupler 53 may be a fused bi-conical taper coupler which is formed by fusing and extending two optical fibers 58 and 59. The terminal of the optical fiber 59b which extends from the fiber coupler 53 is dipped in matching oil 57 so that a return light from the optical fiber 59b to the fiber coupler 53 is prevented.

An optical spectrum analyzer 55 is arranged at an output of the optical fiber 20 and a filter 56 is provided therebetween. The filter 56 cuts the excitation light outputted from the optical fiber 20. As a result, only the signal light outputted from the optical fiber 20 can be measured by the optical spectrum analyzer 55, and the gain of light amplification can be determined.

EXAMPLES

The following examples are provided to illustrate embodiments of the present invention, but they are by no means intended to limit its scope.

Example 1
Fiber with Absorbing Primary Coating
(Comparative)

A glass fiber was constructed via the double crucible method using a glass core formed from an antimony-oxide glass and an antimony-oxide cladding layer as noted in Table 1 below.

TABLE 1

Glasses of Core and Clad Layers for Conventional Fiber

|  | Core Glass (mole %) | Clad Glass (mole %) |
| --- | --- | --- |
| $SiO_2$ | 75.5 | 77.5 |
| $Al_2O_3$ | 0.5 | 1 |
| $Al_2F_6$ | 2 | 1 |
| $Sb_2O_3$ | 22 | 20.5 |
| $Er_2O_3$ | 0.075 | — |

The primary coating was a multi-functional acrylate coating, which was applied using conventional procedures. The primary coating included a black dye to render the primary coating capable of absorbing cladding modes. The numerical aperture of clad with respect to the primary coating was approximately 0.6, whereas that between the clad and core was approximately 0.22.

The fiber was tested on a Photon Kinetics (hereinafter "PK") bench attenuation measurement device. A suitable device is Model 2500, optical fiber analysis system, from Photon Kinetics of Beaverton, Oreg. The user's manual for the model is incorporated herein by reference. The use of Model 2500 to perform the attenuation measurement is explained therein.

The cutback method was used to test the attenuation of the fiber. The cutback method calculates the optical loss characteristics of a fiber by measuring the power received on the output side the fiber at various lengths. The method includes launching an optical signal, of a relative strength, through a first end of the test fiber by the use of an optical source. A portion of the launched optical signal may travel in the cladding.

The signal is detected at a second end of the fiber and the power of the signal at the second end is measured. The signal is detected by use of an optical detector. The detectors accounts for all of the light at the second end of the fiber, irrespective if the light was propagated in the core or the cladding.

The length of fiber must be such that a detectable amount of the signal is present at the second end of the fiber. This length of fiber is known as $L_1$.

The fiber is cut to a length $L_2$, which is less than $L_1$. Once again an optical signal is transmitted through the fiber and the signal strength is detected at the second end of the fiber. The optical loss is determined based on the difference in signal strength for measurements at lengths $L_1$ and $L_2$. The optical loss is $10 \log_{10}$ (Power $(L_2)$/Power $(L_1)$). The attenuation is determined by dividing the optical loss by the difference in length between $L_1$ and $L_2$.

Table 2 depicts PK bench attenuation measurements of various cutback lengths of the fiber. The cutback length is a phrase used to describe the length $L_1$ minus $L_2$ of the tested fiber. The cited results are the average attenuation of the actual cutback lengths. The attenuation increased as the cut backs were made closer to the source, indicating that the use of an absorbing primary coating layer was insufficient to substantially eliminate light propagating in the cladding.

TABLE 2

Attenuation (dB/m) (No Overclad Layer)

| Wavelength | 40-28m cutback | 28-16m cutback | 2dm cutback |
| --- | --- | --- | --- |
| 1100 nm | 0.35 | 0.4 | 2.7 |
| 1200 nm | 0.35 | 0.5 | 2.8 |
| 1300 nm | 0.35 | 0.5 | 2.9 |

Example 2

Glass Fiber with Overclad Layer

An optical fiber of the present invention was prepared using a triple crucible method with the glass compositions listed in Table 2 below and conventional primary and secondary coatings.

TABLE 3

Glasses of Core, Clad, and Overclad Layers for Fiber of Invention

|  | Core Glass (mol %) | Clad Glass (mol %) | Overclad Glass (mol %) |
| --- | --- | --- | --- |
| $SiO_2$ | 75.5 | 77.5 | 77.5 |
| $Al_2O_3$ | 0.5 | 1 | 1 |
| $Al_2F_6$ | 2 | 1 | 1 |
| $Sb_2O_3$ | 22 | 20.5 | 20.5 |
| $Er_2O_3$ | 0.075 |  | 0.2 |
| $Pr_2O_3$ |  |  | 0.2 |
| NiO |  |  | 0.1 |
| FeO |  |  | 0.2 |
| CuO |  |  | 0.2 |

Dopants (e.g., $Er_2O_3$, $Pr_2O_3$, NiO, FeO, and CuO) were added to the core and overclad glasses in excess of the 100 mol % of the batch ingredients.

Figure 7:
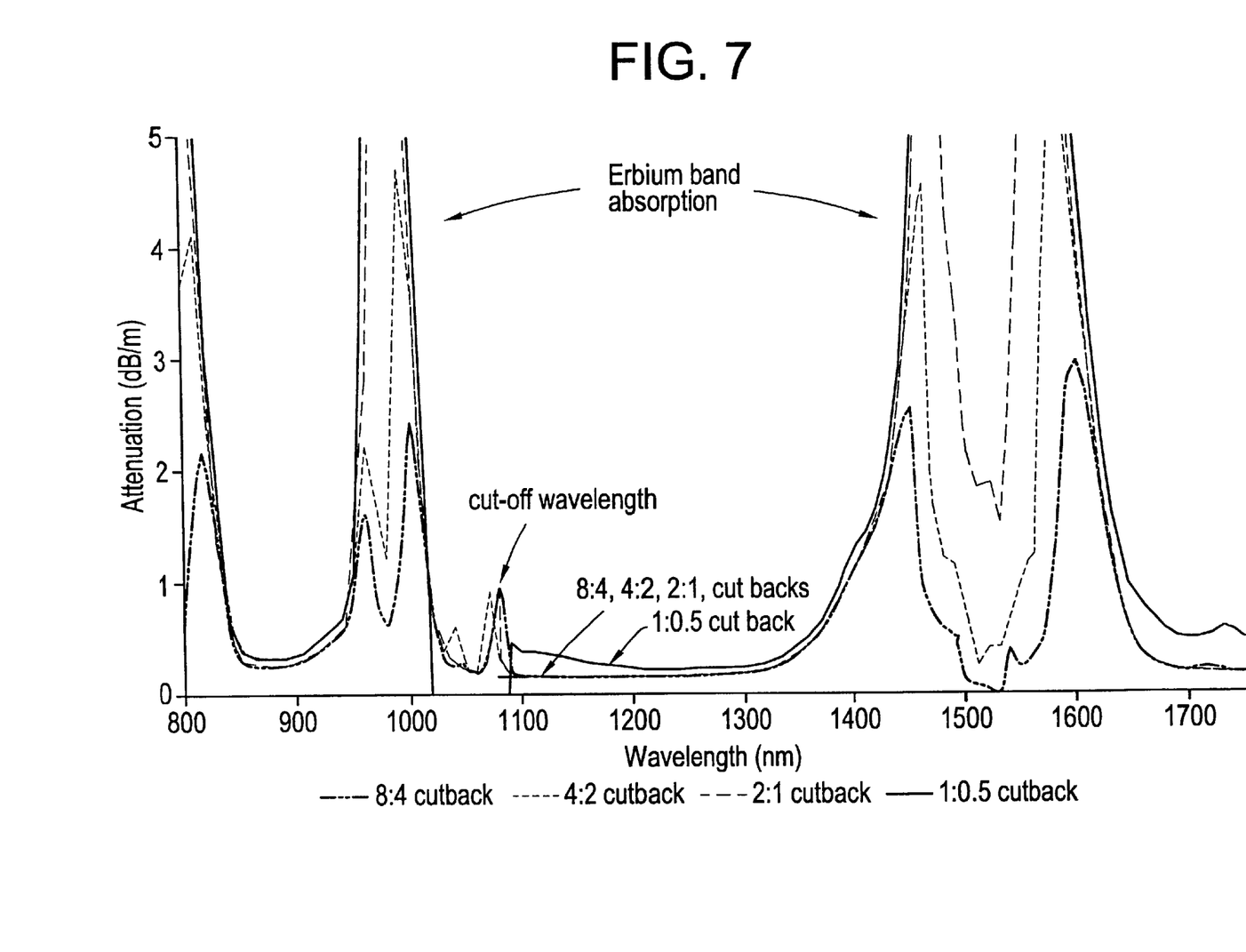
FIG. 7 is a graph depicting Photon Kinetics bench attenuation measurements over the illustrated spectrum for varying lengths of the fiber of the present invention. Fiber lengths varied from 8 meters to ½ a meter in length. Each of the tested fibers demonstrated similar attenuation over the broad band between about 1050 nm and about 1300 nm, illustrating that fibers of the present invention can minimize attenuation within a length of fiber that is about ½ a meter.

FIG. 7 shows an attenuation measurement obtained from a PK bench for this configuration. The spectrum shows off-scale absorptions at 980 nm and 1530 nm, indicating that essentially all of the light is propagating along the core. A suitable result is obtained regardless of the fiber length (i.e., the length of the cutback used in the various measurements). As shown in FIG. 7, cutbacks from 8 meters to ½ meter produced substantially identical results. The fiber consistently exhibited an attenuation of less than 0.2 dB/m. At a cutback length of ½ a meter, the attenuation was no more than 0.15 dB/m.

The inventive fiber has the advantage of having a substantially consistent attenuation over various lengths of fiber. This is an indication that light propagating in the cladding has been absorbed by the overclad.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An amplifier fiber comprising:
   a glass core;
   a glass cladding layer surrounding said glass core and having a refractive index which is less than a refractive index of said glass core, and
   an absorbing glass overclad layer surrounding said cladding layer to substantially eliminate a cladding mode of light propagating in said cladding layer, said absorbing glass overclad layer having a refractive index which is greater than said refractive index of said cladding layer, and wherein said absorbing glass overclad layer has an inside radius at least three core radii from the central axis of said amplifier fiber and which absorbing glass overclad layer is disposed on at least the outer most 10 µm of said amplifier fiber.

2. The fiber of claim 1 wherein said refractive index of said core comprises a sufficiently high refractive index to guide a fundamental mode of light propagating in the fiber.

3. The fiber of claim 1 wherein said core comprises an amplification dopant.

4. The fiber of claim 1 wherein said absorbing glass overclad layer further comprises at least one absorber.

5. The fiber of claim 4 wherein said absorber is one selected from the group consisting of transition metal ions, rare earth ions, metals, metalloids, organic dyes, and combinations thereof.

6. The fiber of claim 5 wherein said absorber is selected from the group consisting of vanadium ions, erbium ions, titanium ions, iron ions, copper ions, praseodymium ions, and ytterbium ions, platinum, carbon, and mixtures thereof.

7. The fiber of claim 5 wherein said absorbing glass overclad layer comprises a combination of at least two of the group consisting of erbium ions, iron ions, copper ions, praseodymium ions, and nickel ions.

8. The fiber of claim 7 wherein the concentration of each of said ions is greater than 50 ppm.

9. The fiber of claim 1 wherein at least one of said glass core, said cladding layer, and said absorbing glass overclad layer comprises antimony-oxide.

10. The fiber of claim 1 wherein said glass core, said cladding layer, and said absorbing glass overclad layer comprises antimony-oxide.

11. The fiber of claim 1 wherein said refractive index of said absorbing glass overciad layer is no more than about 0.1 greater than said refractive index of said cladding.

12. The fiber of claim 4 wherein said absorbing glass overciad layer comprises an absorption coefficient more than about ten times greater than an absorption coefficient of said glass core.

13. The fiber of claim 1 wherein said fiber has an attenuation of less than 0.3 dB/m.

14. The fiber of claim 1 wherein said fiber has an attenuation of no more than 0.15 dB/m.

15. The fiber of claim 1 wherein said absorbing glass overclad layer has a refractive index which is about the same as said refractive index of said cladding layer.

16. The fiber of claim 1 wherein said fiber has a length of no more than 30 meters to substantially eliminate said cladding mode.

17. The fiber of claim 1 wherein said cladding mode of light is eliminated within a length of no more than 5 meters of said amplifier fiber.

18. The fiber of claim 1 wherein said cladding mode of light is eliminated within a length of no more than 1 meter of said amplifier fiber.

19. The fiber of claim 1 wherein said cladding mode of light is eliminated within a length of no more than ½ a meter of said amplifier fiber.

20. The fiber of claim 7 wherein said concentration of each of said ions comprises more than 1000 ppm.

21. A method of making an amplifier according to claim 1 comprising:
heating a preform comprising a core glass material surrounded by a clad glass material and an overclad glass material and
drawing the heated preform under conditions effective to prepare the glass fiber.

22. A method of making an amplifier fiber according to claim 17 comprising:
simultaneously drawing the glass core from a body of molten core glass material, drawing the cladding layer from a body of cladding layer material, and drawing the overclad layer from a body of overclad layer material under conditions effective to form the fiber.

* * * * *